(12) United States Patent
Blinn et al.

(10) Patent No.: US 11,223,617 B2
(45) Date of Patent: *Jan. 11, 2022

(54) DOMAIN NAME REGISTRAR DATABASE ASSOCIATING A TEMPORARY ACCESS CODE AND AN INTERNET RELATED ACTIVITY OF A USER

(71) Applicant: Go Daddy Operating Company, LLC, Scottsdale, AZ (US)

(72) Inventors: Arnold Neil Blinn, Hunts Point, WA (US); Mitchell Dean Olson, Seattle, WA (US); Jacob Louis Brooks, Kirkland, WA (US); John Basyl Kercheval, Lake Forest Park, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 652 days.

This patent is subject to a terminal disclaimer.

(21) Appl. No.: 16/195,685

(22) Filed: Nov. 19, 2018

(65) Prior Publication Data
US 2020/0162453 A1     May 21, 2020

(51) Int. Cl.
*H04L 29/06*     (2006.01)
*G06Q 30/00*    (2012.01)
(Continued)

(52) U.S. Cl.
CPC ...... *H04L 63/0846* (2013.01); *G06F 16/2228* (2019.01); *G06F 16/958* (2019.01); *G06Q 30/016* (2013.01)

(58) Field of Classification Search
CPC . H04L 63/0846; G06F 16/958; G06F 16/2228
See application file for complete search history.

(56) References Cited

U.S. PATENT DOCUMENTS

| 2006/0168164 A1* | 7/2006 | Lemson | G06Q 10/107 709/221 |
| 2006/0174104 A1* | 8/2006 | Crichton | H04L 63/08 713/155 |

(Continued)

OTHER PUBLICATIONS

Kountouras A. et al. (2016) Enabling Network Security Through Active DNS Datasets. In: Monrose F., Dacier M., Blanc G., Garcia-Alfaro J. (eds) Research in Attacks, Intrusions, and Defenses. (Year: 2016).*

*Primary Examiner* — Jung W Kim
*Assistant Examiner* — Angela R Holmes
(74) *Attorney, Agent, or Firm* — Greenberg Traurig, LLP

(57) ABSTRACT

An Internet resource provider (IRP) may authenticate a user and, upon a successful authentication, allow the user to perform one or more actions on webpages that are within an account of the user. The IPR may store the most recent actions of the user in a temporary access code (TAC) database. If the user has a problem, the user may select a TAC button on a webpage within the account of the user. The IPR may generate a TAC, store the TAC in association with the recent activities of the user in the TAC database and transmit the TAC to the user. The user may contact and provide the TAC to a customer support service center. The customer support service center may authenticate the user based solely on the TAC and determine the one or more recent actions of the user in the TAC database. The customer support service center may provide assistance to the user based at least partially on the one or more recent actions of the user.

20 Claims, 8 Drawing Sheets

(51) Int. Cl.
*G06F 16/958* (2019.01)
*G06F 16/22* (2019.01)

(56) References Cited

U.S. PATENT DOCUMENTS

2007/0300174 A1* 12/2007 Macbeth ................ G06Q 10/10
    715/772
2011/0213822 A1* 9/2011 Yavilevich .............. H04L 67/02
    709/202

* cited by examiner

Temporary Access Code (TAC) Database 155

| TAC 510 | Webpage where TAC selected 600 | Recent Activities 610 | Time on Last Activity 620 | Recent Menu Items Selected 630 | Recent Data Entered 640 | Recent Error Messages 650 |
|---|---|---|---|---|---|---|
| 3S8HJK | 20 | Renew Domain Name | 5:37 | Renew DN | Sample | Unable to Renew Domain Name |
| 384591 | 33 | Add SSL to Website | 1:32:20 | Add SSL Cert | Domain.com | Insufficient Authority to Perform Request |
| 1&Y2 | 42 | Publish Website | 43:20 | Publish | Tasty.com | Entered nameserver not recognized |

FIG. 6

DOMAIN NAME REGISTRAR DATABASE ASSOCIATING A TEMPORARY ACCESS CODE AND AN INTERNET RELATED ACTIVITY OF A USER

FIELD OF THE INVENTION

The present invention generally relates to systems and methods of generating a database comprising a temporary access code (TAC) and an associated Internet related activity of a user.

SUMMARY OF THE INVENTION

In an example embodiment, a user, using a client device, may contact an Internet Resource Provider (IRP) and, using login credentials, log into an account of the user. The IRP may confirm that the login credentials sent by the user match the login credentials associated with an account of the user. If the login credentials entered by the user do not match the login credentials associated with the account of the user, the user is not authenticated and the user is not logged into the account of the user.

Once the user is authenticated, the user may be transmitted webpages by the IRP that include functions that are only appropriate for authenticated user. As an example, a webpage that allows a user to delete, amend or publish a website should only be shown to the user that is the owner of the website. One or more, or preferably all, of the webpages in the account of the user include a TAC button. The TAC button may be an item from a drop-down menu, link or icon that may be selected by the user. The IRP may monitor and record the successes and/or failures of various activities attempted by the user while the user is in the account of the user. As an example, the IRP may monitor and store all activities that were attempted, but not completed, in a TAC database.

While the user is performing various activities in the account of the user, the user may have a question or a problem. The user may select the TAC button from a webpage in the account of the user in anticipation of calling a customer service support center for assistance. The IRP may, upon detecting the user has selected a TAC button on one of the webpages in the account of the user, generate the TAC, i.e., a unique random string of characters. The TAC may be used by the user (or a third party given the TAC by the user) to be authenticated for a preselected period of time. For example, the TAC may be valid to authenticate the user for one hour with the customer support service center. The IRP may store the TAC in the TAC database in such as a way as to link or associate the TAC with the stored activities of the user in the TAC database.

The IRP may transmit the TAC to the user using any desired means of communication. Preferably the user is able to select the communication means for receiving the TAC, such as receiving a text message with the TAC to a cell phone, receiving an email with the TAC to an email account, and/or receiving a webpage with the TAC displayed on the client device, such as the webpage where the user selected the TAC button.

The IRP may have a customer support service center that customers may contact when the customers have questions or problems with their services. The customer support service center may receive a telephone call (or webpage contact) and receive the TAC from the user. The customer support service center may try to match the TAC to the TACs in the TAC database. If the TAC entered by the user does not match any TACs stored in the TAC database, the user is not authenticated.

If the TAC entered by the user matches a TAC in the database, the customer support service center preferably authenticates the user based solely on the TAC, i.e., no additional authentication credentials are provided, and determines one or more activities in the TAC database that are associated with the TAC. The one or more activities of the user may be displayed to a customer support representative to enable the customer support representative to more quickly and efficiently understand the question(s) and/or problem(s) of the user. Based on the one or more activities, the customer support representative may ask additional questions, provide instructions or take actions approved by the user. In this manner, the user may have an improved experience in obtaining assistance from the customer support service center of the IRP.

The above features and advantages of the present invention will be better understood from the following detailed description taken in conjunction with the accompanying drawings.

BRIEF DESCRIPTION OF THE DRAWINGS

FIG. 5 illustrates that the TAC may be displayed to the user on the same webpage (possibly in a pop-up) immediately after selecting the TAC button. In other embodiments, the TAC may be delivered to the user by any desired means, such as by text message to a cell phone or an email to an email account of the user.

FIG. 6 represents a temporary access code (TAC) database. The database illustrates that a plurality of different TACs may be stored and associated with a history of activities recently performed by the user.

DETAILED DESCRIPTION

Figure 1:
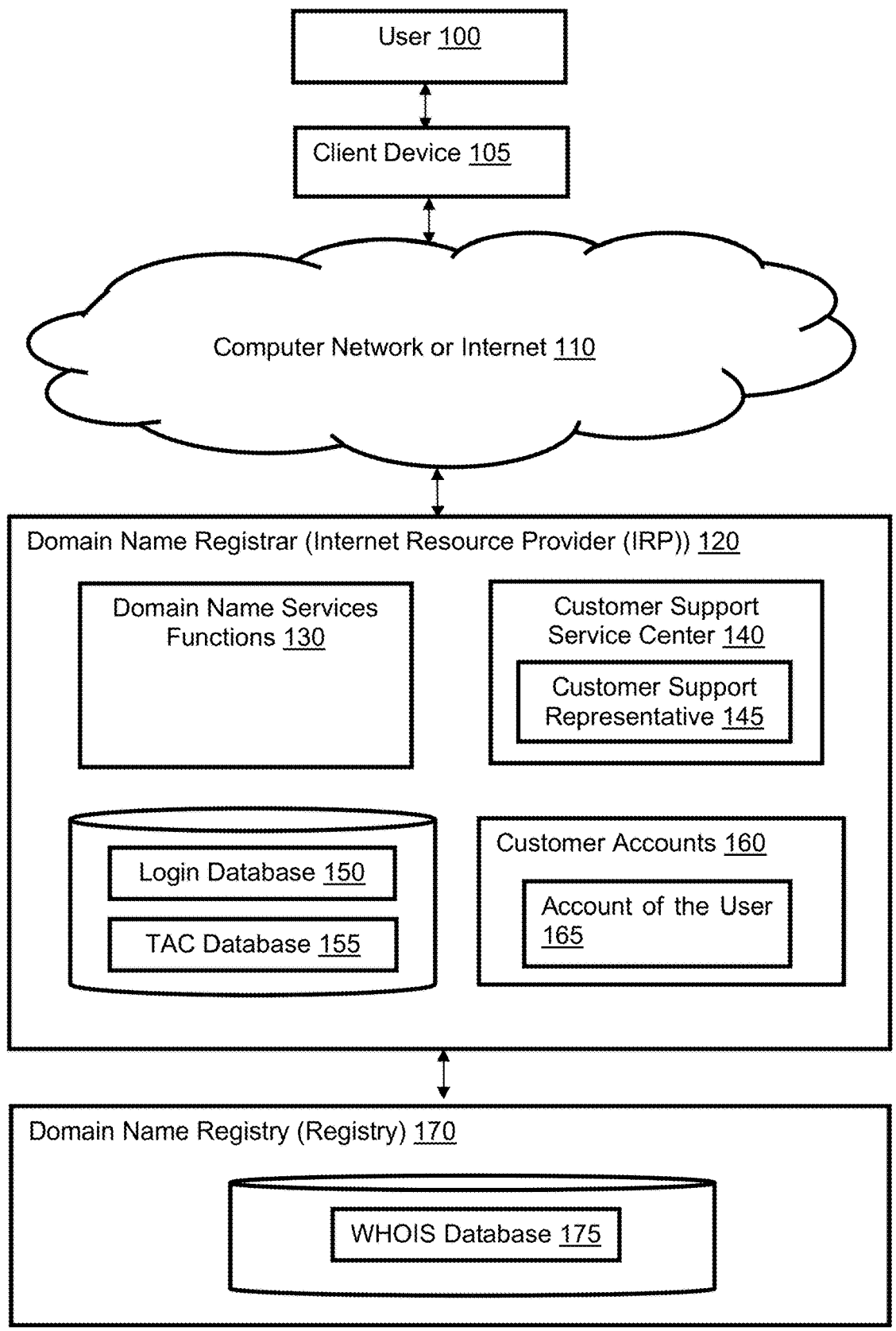
FIG. 1 is a block diagram of a system that may be used to practice the present invention, wherein the system is an Internet service provider, such as a domain name registrar.

The present inventions will now be discussed in detail with regard to the attached drawing figures that were briefly described above. In the following description, numerous specific details are set forth illustrating Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Figure 2:
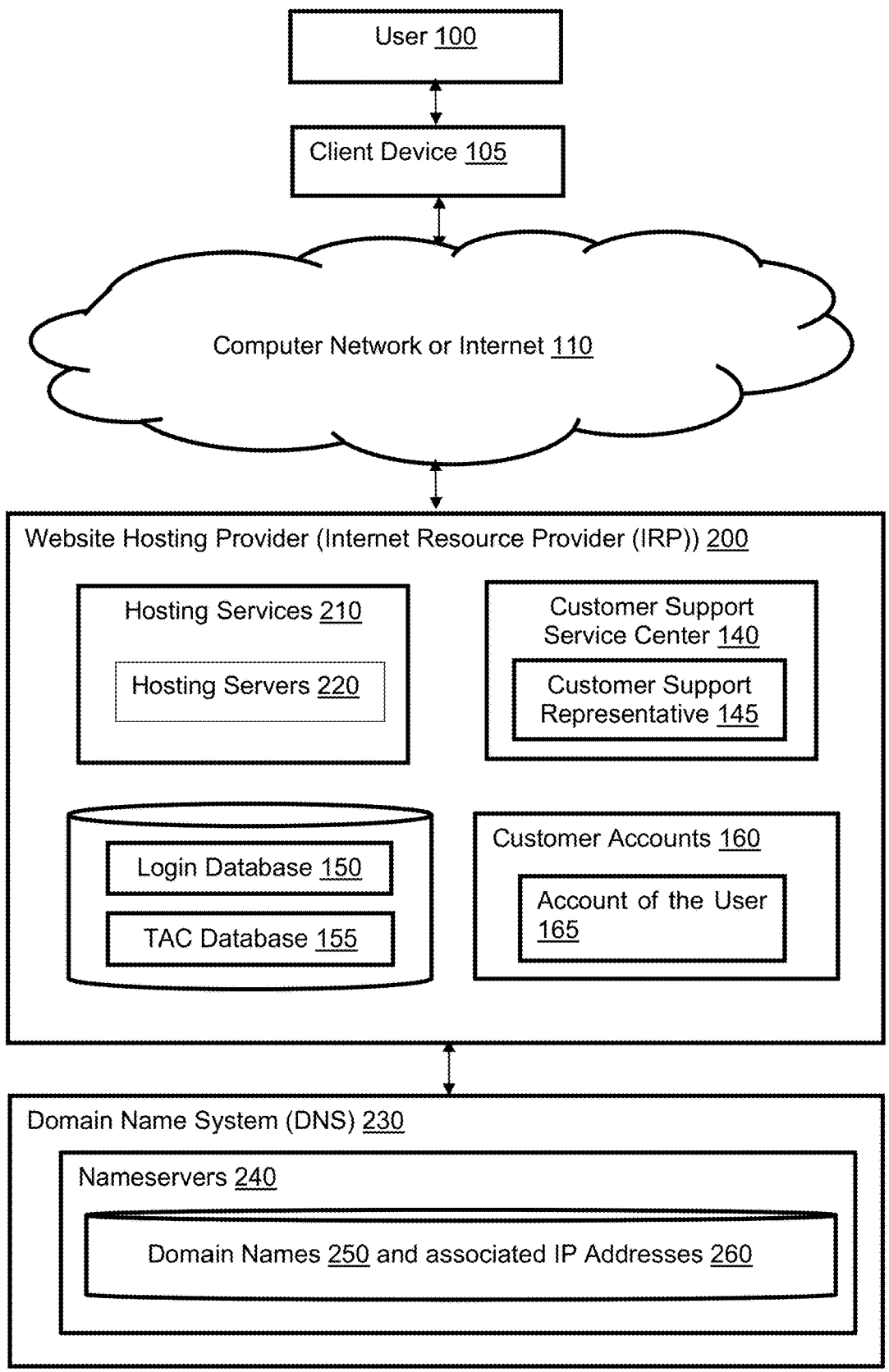
FIG. 2 is a block diagram of a system that may be used to practice the present invention, wherein the system is an Internet service provider, such as a website hosting provider.

FIGS. 1 and 2 are block diagrams of examples of Internet resource providers (IRP) 120, 200 that may be used to practice the present invention. The IRPs 120, 200 may be, as non-limiting examples, a domain name registrar (registrar) 120 or a website hosting provider (hosting provider) 200 that provide an Internet service or resource. In other embodiments, the IRP 120, 200 may manage other Internet services, such as, as non-limiting examples, email accounts, SSL certificates or domain name system (DNS) 230 providers.

The illustrated user 100 may be an individual or agent of a company that is purchasing an Internet service, such as, as non-limiting examples registering domain names or purchasing hosting services 210. The user 100 may contact the IRP 120, 200 using a client device 105. The client device 105 may be a cell phone, tablet, laptop or desktop computer or any other electronic device that may transmit information across the Internet 110 to the IRP 120, 200. The client device 105 may have a unique telephone number from which the user 100 can verify that the user 100 has control over the client device 105. The client device 105 may also be able to measure/record, store and transmit biometric measurements, such as one or more fingerprints of the user 100, the voice of the user 100, possibly saying a particular phrase and/or measuring an iris scan of the user 100. In other embodiments, a biometric recording device may be attached to the client device 105 (at which time the biometric recording device and the client device 105 may both be considered the client device 105) to enable the client device 105 to perform one or more biometric measurements and/or recordings.

The arrows between the client device 105, computer network or Internet 110, IRP 120, 200, domain name registry 170 and nameservers 240 represent one or more communication paths and/or computer networks. Communications and transmissions over the arrows may use any currently known or developed in the future methods or protocols of electronic communications.

A computer network is a collection of links and nodes (e.g., multiple computers and/or other devices connected together) arranged so that information may be passed from one part of the computer network to another over multiple links and through various nodes. Non-limiting examples of computer networks include the Internet 110, public switched telephone networks, global Telex networks, intranet(s), extranet(s), local-area network(s), wide-area network(s), wired networks, wireless networks and cell phone networks.

The Internet 110 is a worldwide network of computers and computer networks arranged to allow for the easy and robust exchange of information between a computer user 100 via a client device 105 and one or more websites hosted on hardware servers. Hundreds of millions of users (people) around the world have access to client devices connected to the Internet 110 via an Internet Service Provider (ISP). Content providers place multimedia information (e.g., text, graphics, audio, video, animation, and/or other forms of data) at specific locations on the Internet 110 referred to as websites. The combination of all the websites and their corresponding web pages on the Internet 110 is generally known as the World Wide Web (WWW) or simply the Web.

Websites may consist of a single webpage, but typically consist of multiple interconnected and related webpages. The webpages may be considered interfaces that display information to the user 100 and also allow the user 100 to enter information. Websites may reside on one or more hardware servers and are typically prepared and maintained by a single individual or entity. Menus, links, tabs, etc. may be used to move between different webpages within the website or to move to a different webpage on an entirely different website.

Websites may be created using software or code to program the website to appear and operate as desired by a website designer. As a non-limiting example, HyperText Markup Language (HTML) may be used to generate a standard set of tags that define how the webpages for the website are to be displayed. A user 100 of the Internet 110 may access websites using software known as an Internet browser, such as MICROSOFT INTERNET EXPLORER®, GOOGLE CHROME® or MOZILLA FIREFOX®.

After the browser has located the desired webpage, the browser requests and receives information concerning the webpage, i.e., software or computer code, typically in the form of an HTML document, and then the browser displays the webpage content for the user 100 on the client device 105 operated by the user 100. The user 100 then may see the displayed information, e.g., text, pictures and/or graphics, hear any transmitted sounds, enter information into fields on the webpage configured for this purpose, view other webpages at the same website and/or move to an entirely different website using the browser.

Each website on the Internet 110 may have a plurality of webpages and be hosted or operated from one or more hardware servers. The application may also be running or operated from one or more hardware servers of any desired make or model. The hardware servers for the websites and the applications may be, as a non-limiting example, one or more Dell PowerEdge(s) rack server(s), HP Blade Servers, IBM Rack or Tower servers, although other types of hardware servers and/or combinations of one or more hardware servers may also be used. The domain name registrar is hereby defined to comprise at least one or more hardware servers and may also comprise software to automate the various processes described as part of this invention.

Browsers are able to locate specific websites because each website, resource, and computer on the Internet 110 has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The newer IP address standard, often called IP Version 6 (IPv6), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313). These notations are used to improve human readability.

IP addresses, however, even in human readable notation, are difficult for people to remember and use. A Uniform Resource Locator (URL) is much easier to remember and may be used to point to any computer, directory, or file on the Internet 110. A browser is able to access a website on the Internet 110 through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" portion identifies the URL as a HTTP request and the "companyname.com" portion is the domain name.

Domain names are much easier to remember and use than their corresponding IP addresses. The Internet Corporation for Assigned Names and Numbers (ICANN) and the Internet Assigned Numbers Authority (IANA) create rules and coordinate the use of over 1,000 Top-Level Domains (TLDs). Each TLD is typically assigned a single registry 170 to be an authoritative source of information (the particular data stored by the registry 170 may vary depending on the TLD). One or more domain name registrars may register domain names to domain name registrants (users 100, customers and/or domain name registrants) on behalf of a registry 170 controlling the TLD of the registered domain names. The domain name registry 170 stores for each registered domain name contact information, possibly via a proxy service, for the domain name registrant and, if set-up, one or more nameserver(s) 240 for the domain name in the WHOIS database 175.

The process for registering a domain name with .com, .net, .org, and some other TLDs allows a domain name registrant to use an ICANN-accredited domain name registrar to register a domain name. For example, if a potential domain name registrant, John Doe, wishes to register the domain name "Abc-company.com," John Doe may initially determine whether the desired domain name is available by contacting a domain name registrar. As a non-limiting example, the potential domain name registrant (user 100 or customer) may make this contact using the registrar's webpage and typing the desired domain name into a field on the registrar's website created for this purpose. If the domain name is available, the registrar may register via the domain name registry 170 the domain name to the user 100 (officially the domain name registrant at this point). In this manner, the user 100 may register any number of different domain names and may point each registered domain name through the domain name system (DNS) 230 to any desired website.

Domain names may point, i.e., direct Internet traffic, to a website through the use of the DNS. The DNS comprises one or more nameservers 240 that are able to receive a domain name 250 from a browser and then return an IP address 260 that is associated with the domain name 250 to the browser. In this manner, the browser may find the IP address 260 for any website through the use of the DNS 230.

In FIG. 1, the IRP 120 is specifically identified as a domain name registrar (registrar). The registrar is illustrated as comprising a domain name services functions 130, a customer support service center 140, a login database 150, a Temporary Access Code (TAC) database 155 and customer accounts 160.

The domain name services function may allow, as non-limiting examples, a user 100 to check on the availability of any domain name, register any available domain name in cooperation with the appropriate domain name registry 170, renew any previously registered domain name by the user 100 and/or point any domain name to a website through one or more nameservers (illustrated in FIG. 2).

In FIG. 2, the IRP is specifically identified as a website hosting provider or hosting provider 200. The hosting provider 200 is illustrated as comprising hosting services 210 with one or more hosting servers 220, a customer support service center 140, a login database 150, a TAC database 155 and customer accounts 160.

The hosting services 210 may allow, as non-limiting examples, a user 100 to create a website, the user 100 to update the website and/or the user 100 to host the website on the hosting servers 220 so that the website is available to other Internet users using client devices with website browsers. The hosting services 210 may also allow the user 100 to associate a domain name registered to the user 100 to a website owned and operated by the user 100 in cooperation with one or more nameservers. The nameservers may store registered domain names with each domain name being associated with an IP address. A browser may thus send a domain name to a nameserver and receive an IP address associated with the domain name. The browser may then use the IP address to locate the website or website resource.

The IRP 120, 200, whether as a registrar 120 or a website hosting provider 200, may also comprise a customer support service center 140. The customer support service center 140 may comprise a plurality of customer support representatives 145 that may receive telephone calls and/or Internet 110 connections from a plurality of users 100 (who are likely customers) operating client devices 105. The customer support representatives 145 preferably have access to the customer accounts 160 so that the customer support representative 145 may read information and make changes to the customer accounts 160. The customer support representative 145 preferably also has access to the TAC database 155 in order to authenticate the user 100 and receive information regarding the recent activities of the user 100. The customer support representative 145 may give verbal advice to users 100 or, if given permission, make changes to an account 165, domain name and/or hosting service 210 of the user 100.

In an embodiment of the invention, an IRP 120, 200 may authenticate the user 100 using any desired method or combination of methods. As non-limiting examples, the IRP 120, 200 may authenticate the user 100 based on something the user 100 has (such as a cell phone or an email account), something the user 100 knows (such as an account name and password) and/or something the user 100 is (such as a finger print or a retinal scan). The IRP 120, 200 may require the user 100 to be authenticated before the IRP 120, 200 allows the user 100 to access the account of the user 165. Once the user 100 accesses the account of the user 165, the user 100 may have access to webpages 400, 500 that permit actions reserved for the owner of the account.

Figure 3:
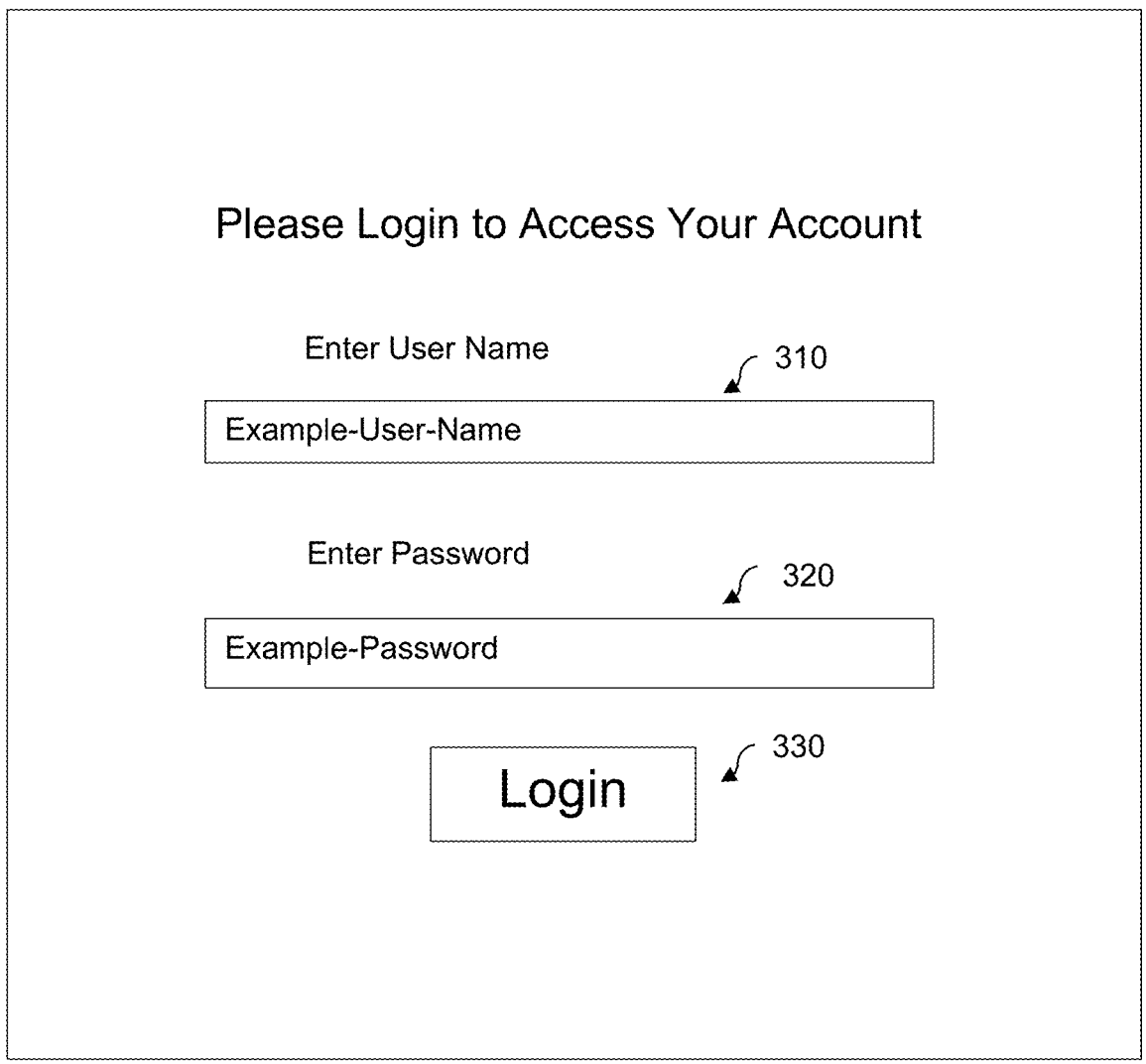
FIG. 3 is an example login webpage, which is configured to allow a user to enter information (something the user knows, something the user is or something the user has) which may be used to authenticate the user.

Referring to FIG. 3, a simplified login webpage 300 is displayed. In this example login webpage, the user 100 is allowed to enter a user name in a user name field 310 and a password in a password field 320. After entering the user name and the password, the user 100 may select the login button 330 to start the authentication process.

The IRP 120, 200 may match the received login credentials, in this case the user name and the password, from the client device 105 with login credentials previously stored in a login database 150 to thereby authenticate the user 100. The IRP 120, 200 may have stored the login credentials in the login database 150 when the user 100 first created the account of the user 165 or when the user 100 last updated the login credentials. The IRP 120, 200 preferably selects an authentication method or combination of authentication methods to achieve a desired level of security.

The IRP 120, 200 preferably only logs the user 100 into the account of the user 165 after the IRP 120, 200 has successfully matched the entered login credentials of the user 100 with the login credentials of the user 100 stored in the login database 150. The account of the user 165 may be configured to allow the client device 105 of the user 100 to receive a plurality of webpages 400, 500 from the IRP 120, 200. These webpages 400, 500 may be used by the user 100 to manage the Internet services of the user 100 offered by the IRP 120, 200. The user 100 may visit any number of different webpages 400, 500 in the account of the user 165 and attempt to perform any number of different actions in managing the user's Internet services.

Figure 4:
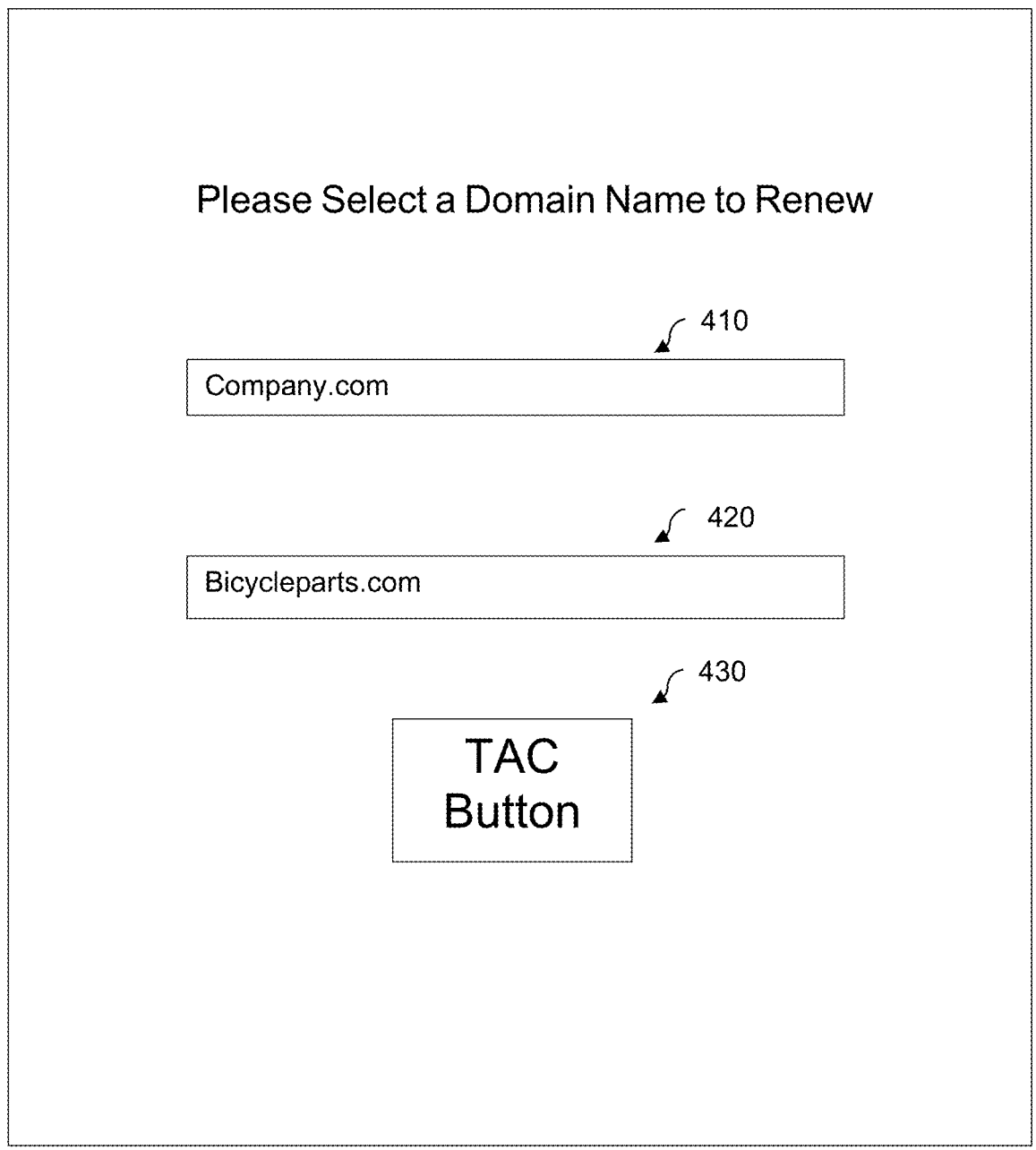
FIG. 4 is a simplified example account webpage that may be used by a user, only after being authenticated, to manage an internet service as the rightful owner of the Internet service. In this example user account webpage a user may renew one or more domain names (an activity that only the rightful owner of the account may do). The example user account webpage includes a selectable icon (which could also be a menu item) for generating a TAC if the user is having problems.

In a preferred embodiment, one or more webpages 400, 500 accessible to the user 100 in the account of the user 165 comprise a displayed TAC button 430 that is configured to be selected by the user 100. The TAC button 430 may be part of a drop-down menu, a link or an icon displayed on the webpage 400, 500 and the TAC button 430 may be selected by the user 100 by any desired means. Referring to FIG. 4, an example webpage 400 is displayed that allows the user 100 to manage a service offered by an IRP 120, 200. In this example, the webpage 400 allows a user 100 to select a domain name 410, 420 that the user 100 desires to renew.

If the user 100 has a problem or a question regarding recent activities the user 100 has performed or attempted to perform while in the account of the user 165, such as renewing a domain name, the user 100 may select the TAC button 430. The IRP 120, 200, having detected that the user 100 has selected the TAC button 430, may generate a TAC 510. The TAC 510 may comprise any desired number of characters and the characters may be of any desired type, such as alpha-numeric and/or any symbols. In a preferred embodiment, the TAC 510 comprises only five to ten numbers.

Figure 5:
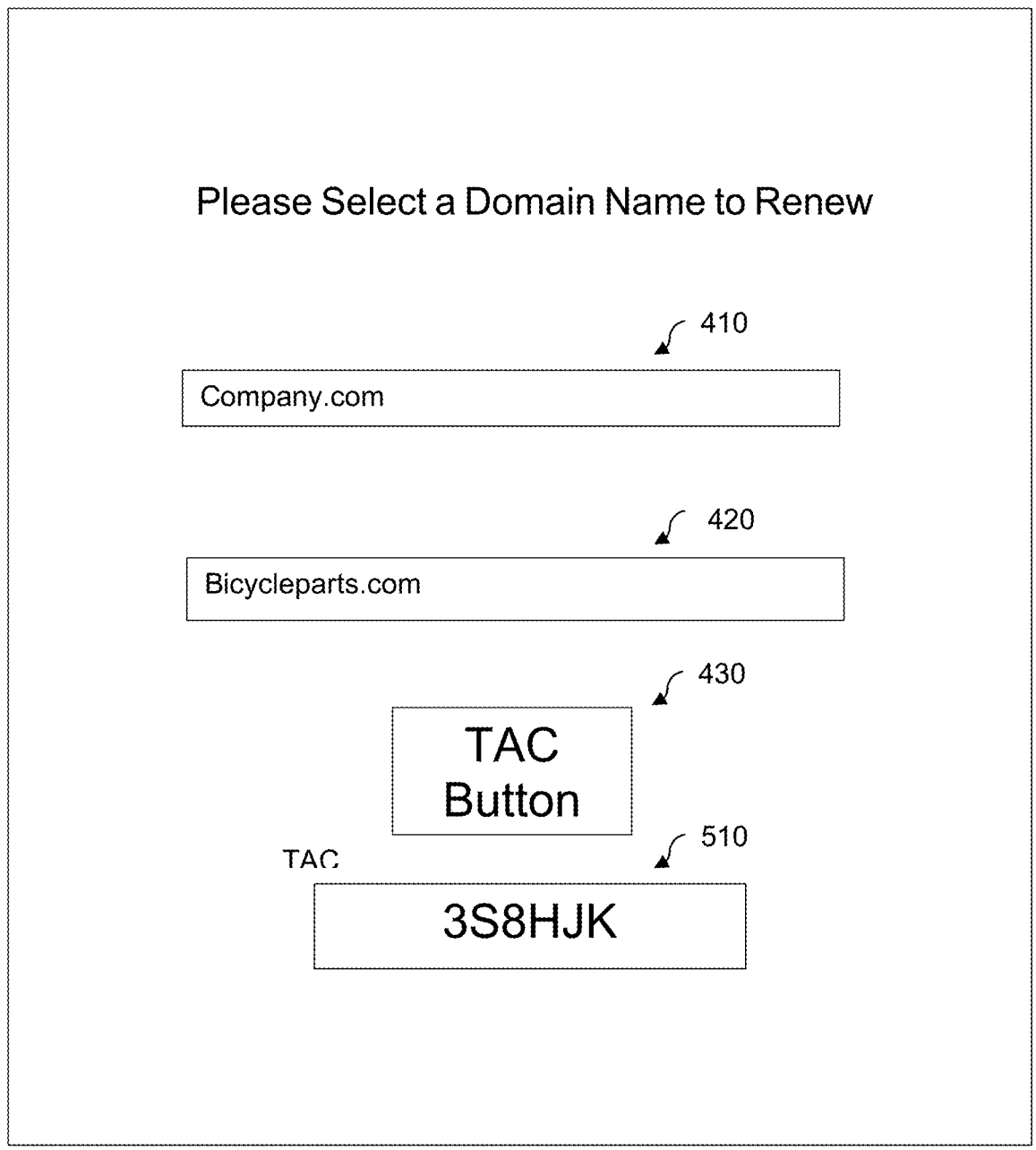
FIG. 5 represents an example webpage after the TAC icon in FIG. 4 has been selected.

In the example of FIG. 5, the TAC 510 of "3S8HJK" may be generated and displayed to the user 100 on the webpage 500 with the TAC button 430. In other embodiments, possibly based on preferences preselected by the user 100, the TAC 510 may be sent as a text message to a cell phone number provided by the user 100 or to an email address provided by the user 100.

The IRP 120, 200 may create the temporary access code (TAC) database 155 to store the generated TAC 510 and the monitored activities of the user 100. An example TAC database 155 is illustrated in FIG. 6. In the illustrated TAC database 155, three TACs 510 of "3S8HJK," "384591" and "1&Y2" have been generated at the time a user 100 selected a TAC button 430 and stored in the TAC database 155. The three TACs 510 in the TAC database 155 may be for the same or different users 100, with each user 100 knowing only their own TAC(s) 500. The TAC database 155 is configured so that once a TAC 510 is known, one or more activities of the user 100 may be read from the TAC database 155 that are associated with the TAC 510. In the example TAC database 155 in FIG. 6, once the TAC 510 is known, the activities in the same row as the TAC 510 may be determined to be associated with the TAC 510.

The IRP 120, 200 may monitor and record in the TAC database 155 one or more actions or activities performed by the user 100 while the user 100 is logged into the account of the user 165. Thus, as non-limiting examples, the most recent activity may be stored, the five most recent activities may be stored or the 100 most recent activities of the user 100 may be stored in the TAC database 155. In another embodiment, all activities with the last predetermined time period are stored and older activities are deleted. As an example, all activities within the last month may be stored while all activities older than one month are deleted from the TAC database 155. The older activities, based on either a predetermined number of stored activities or predetermined amount of time, may be deleted from the TAC database 155. The actions monitored and stored by the IRP 120, 200 in the TAC database 155 may be any desired actions which the IRP 120, 200 desires to save and that may assist in providing assistance to the user 100.

Referring to FIG. 6, a non-limiting example of a TAC database 155 is illustrated. The data in the TAC database 155 may be organized in any desired manner and any desired number (one or more) and/or types of activities may be monitored and stored. In the example TAC database 155 illustrated in FIG. 6, the data is stored in a table comprising seven columns and four rows (one header row and three rows of activities). Each row of activities is associated with a unique TAC 510. In this example, the table has a column for a unique TAC 510, a column 600 for the webpage where the user 100 selected the TAC button 430, a column 610 for recent activities, a column 620 for the time spent on an activity, a column 630 for recent menu items selected, a column 640 for recent data entered and a column 650 for recent error messages received by the user 100. While these are the particular activities stored in the example TAC database 155 illustrated in FIG. 6, it should be understood that a different number and/or combinations of activities, possibly with totally different activities, may be monitored and stored in the TAC database 155.

In one possible embodiment, the IRP 120, 200 may monitor and store in the TAC database 155 every webpage, preferably in order, visited by the user 100. The IRP 120, 200 may assign each webpage 400, 500 in the account of the customer 165 with a unique name or number and store the name or number in the TAC database 155 to thereby record which webpages 400, 500 the user 100 recently visited.

Referring to FIG. 6, the IRP 120, 200 may monitor and store the webpage 400, 500 the user 100 was visiting when the user 100 selected the TAC button 430. Referring to FIG. 6, the TAC 3S8HJK is associated with the webpage identifier of "20," TAC 384591 is associated with the webpage identifier of "33" and TAC 1&Y2 is associated with the webpage identifier of "42." As a user 100 will likely select the TAC button 430 at the time the user 100 is having a problem or has a question, knowing which webpage 400, 500 the user 100 was on when the problem or question arose may assist a customer service representative in a customer support service center 140 in understanding the nature of the user's problem or question.

In addition, or alternatively, the IRP 120, 200 may monitor and store the most recent functional activity or activities attempted by the user 100 in the TAC database 155. Either completed and/or attempted and failed activities of the user 100 may be stored. Referring to FIG. 6, the TAC 3S8HJK is associated with the recent activity of "renew domain name," TAC 384591 is associated with the activity of "Add SSL to Website" and TAC 1&Y2 is associated with the activity of "publish website." In addition, a data or flag may be stored indicating whether the activity was successfully completed.

In addition, or alternatively, the IRP 120, 200 may time the various activities performed by the user 100 while in the account of the user 165 and store a time for each activity in the TAC database 155. Alternatively, the IRP 120, 200 may also have records for typical ranges of times or an average amount of time that past users have spent on completing different activities. The difference between the time spent on an activity verses an average amount of time normally spent on the activity by other users may be stored in the TAC database 155. The IRP 120, 200 may store the difference in time in the TAC database 155.

Referring to FIG. 6, the TAC 3S8HJK is associated with the time of 5:37 (five minutes and 37 seconds), the TAC 384591 is associated with the time of 1:32:20 (one hour, 32 minutes and 20 seconds) and TAC 1&Y2 is associated with the time of 43:20 (43 minutes and 20 seconds). The amount of time spent by a user 100 on a particular activity may help a customer service representative in determining what sort of problem the user 100 may be having and how best to assist the user 100.

In addition, or alternatively, the IRP 120, 200 may monitor and store in the TAC database 155 recent menu items selected by the user 100. Referring to FIG. 6, the TAC 3S8HJK is associated with selecting the menu item of "renew DN," TAC 384591 is associated with selecting the menu item of "Add SSL Cert" and TAC 1&Y2 is associated with selecting the menu item of "publish." The recent menu items selected by the user 100 may help the customer service representative in determining what problems the user 100 is having, how the user 100 is responding and attempting to perform the activity and how best to assist the user 100.

In addition, or alternatively, the IRP 120, 200 may monitor and store in the TAC database 155 recent data entered by the user 100 on a webpage 400, 500 in the account of the user 165. Referring to FIG. 6, the TAC 3S8HJK is associated with data entered of "Sample," TAC 384591 is associated with data entered of "domain.com" and TAC 1&Y2 is associated with data entered of "Tasty.com." The data entered by the user 100 may help the customer service representative in determining how the user 100 is attempting to perform a recent activity and how best to assist the user 100.

In addition, or alternatively, the IRP 120, 200 may monitor and store in the TAC database 155 recent error messages (or error codes) received by the user 100. Referring to FIG. 6, the TAC 3S8HJK is associated with the user 100 receiving the error message of "Unable to Renew Domain Name," TAC 384591 is associated with the user 100 receiving the error message of "Insufficient Authority to Perform Request" and TAC 1&Y2 is associated with the user 100 receiving the error message of "Entered nameserver not recognized." The error messages recently received by the user 100 may help the customer service representative in determining how best to assist the user 100.

While the example TAC database 155 illustrated in FIG. 6 has only one recent activity, one time of last activity, one recent menu item selected, one recent data entered and one recent error message, two or more of each of these activities may be stored in the TAC database 155. As an example, if three recent activities are stored, then three time on last activity may be stored (one time for each activity). Older or less recent activities may be deleted as desired from the TAC database 155.

While the user 100 is viewing a webpage 400, 500 within the account of the user 165, the user 100 may have a problem or question regarding managing one or more Internet services of the user 100. Referring to FIG. 4, as a non-limiting example, the user 100 may be having a problem or a question regarding selecting a domain name to renew. In this example webpage 400, the domain names of Company.com and Bicycleparts.com are displayed to the user 100 along with a TAC button 430. The user 100 may select, at the user's option, the TAC button 430 on the webpage if the user 100 is having a problem or a question. As an example, the user 100 may select the TAC icon by left clicking on the TAC icon on the webpage with the user's mouse. In other embodiments, the TAC button 430 may be selectable from a drop-down menu or a link on the webpage.

As the IRP 120, 200 is monitoring and storing activities of the user 100, the IRP 120, 200 may detect that the user 100 has selected the TAC button 430 on a webpage. The IRP 120, 200 may generate a random unique TAC 510 (repeats should be discarded so that all TACs 510 stored in the TAC database 155 are unique).

The TAC 510 is hereby defined to have the following features. First, the TAC 510 can only be obtained by someone who has already been authenticated to be in the account of the user 165. Thus, the TAC 510 has the same level of security as the login process. Second, the TAC 510 is only valid for a preselected finite period of time. As non-limiting examples, the TAC 510 may be valid for an hour, a day or a month. Third, the TAC 510 is stored in the TAC database 155 in such a manner that it is associated with a particular past behavior of the user 100. Specifically, the TAC 510 is associated with one or more activities of the user 100 while the user 100 is performing actions in the account of the user 165. As an option, the TAC 510 may be communicated to a third party by the user 100 (such as a technical support person) to assist the user 100 without the user 100 giving the third party the login credentials of the user 100. This allows the user 100 to give another party temporary authority to help the user 100 fix a problem with their Internet service.

Referring to FIG. 5, a webpage 500 may be displayed to the user 100 with the generated TAC 510. In this example, the illustrated TAC 510 is "3S8HJK." Any desired method of securely communicating the TAC 510 to the user 100 may be used. As an example, the generated TAC 510 may be sent as a text message to the user's cell phone or client device 105. In another example, the generated TAC 510 may be sent in an email message to an email account of the user 165. In another example, the generated TAC 510 may be sent via a social media account of the user 100. In a preferred example, the user 100 preselects the method of receiving the TAC 510. In another example, the user 100 is given an option of various methods for receiving the TAC 510 and the IRP 120, 200 sends the TAC 510 to the user 100 using the user 100 selected method. In another example, the IRP 120, 200 may send the TAC 510 to the user 100 using two or more of the above listed methods to increase the chance the user 100 is able to receive the TAC 510.

The IRP 120, 200 may store the TAC 510 in the TAC database 155. In addition, the IRP 120, 200 may store the TAC 510 in the TAC database 155 so as to link or associate the TAC 510 in the TAC database 155 with the monitored and stored activities of the user 100 that requested the TAC 510. This configuration allows the recent activities of the user 100 to be determined or read from the TAC database 155 once the TAC 510 is known.

The user 100 may select the TAC button 430 to assist the user 100 in obtaining assistance from a customer support service center 140. At this point, the user 100 may have 1) been successfully logged into the account of the user 165 by the IRP 120, 200, 2) tried, possibly unsuccessfully, various activities that have been stored in the TAC database 155 by the IRP 120, 200, 3) selected a TAC button 430 which was detected by the IRP 120, 200, and 4) received a TAC 510 that was generated and sent by the IRP 120, 200 to the user 100.

The customer, now knowing the TAC 510, may call a customer support representative operating in a customer support service center 140 of the IRP 120, 200. The customer support representative may authenticate the user 100, using only the TAC 510 received from the user 100. The authentication is performed by the customer service representative confirming the TAC 510 is a stored in the TAC database 155 and is being used within the lifespan of the TAC 510 (older TACs 510 should be removed from the TAC database 155).

In other words, in a preferred embodiment, the user 100 does not provide the customer support service center 140 any authenticating information other than the TAC 510 and matches the TAC 510 with the stored TAC 510 in the TAC database 155 to authenticate the user 100. If the user 100 provides a TAC 510 that is not stored in the TAC database 155, the user 100 is not authenticated and not allowed to make changes to the account of the user 165. This method has the advantage that the user 100 was recently provided the TAC 510 so the user 100 does not have to remember some personal identification number or password that may have been provided a long time ago.

This is a secure method as the user 100 may only receive the TAC 510 after already being authenticated by the IRP 120, 200 as part of the process of logging the user 100 into the account of the user 165. As the user 100 only has to provide the TAC 510 to the customer support representative (and not other authentication information or personal identification numbers), the authentication process at the customer support service center 140 is much more efficient. It should also be appreciated that the strength of the authentication for logging into the account of the user 165 matches the authentication strength of the TAC 510 provided to the customer support service center 140 by the user 100.

The customer support service center 140 may read one or more recent activities of the user 100 from the TAC database 155 that are linked or associated with the TAC 510. As an example, the TAC 510 in FIG. 6 is associated with all the activities in the same row as the TAC 510. The customer support representative may be displayed data from the TAC database 155 showing the recent activities of the user 100, possibly including which webpage 400, 500 the user 100 was on when the user 100 selected the TAC button 430. This background information will greatly speed up the process of the customer support representative figuring out what problem or issue the user 100 is having and what the best advice is to give to the user or what is the best action to take on behalf of the user 100.

The customer support service center 140 may then, based on receiving the TAC 510, perform actions to assist the user 100 that are normally reserved only for the user 100. As an example, only a domain name registrant is typically allowed to renew a domain name registered to the domain name registrant, but once the user 100 provides the TAC 510 to the customer support service center 140, the customer support service center 140 may renew the domain name once given permission by the user 100 that provided the TAC 510.

In some embodiments, the customer support representative is not a person, but an artificial intelligence that is able to determine the best advice or best course of action to take for the user 100. The artificial intelligence may learn from past users that had performed similar activities, with similar results, as the current user 100. The artificial intelligence may then suggest activities or perform actions that most often solved the problem for past users with similar activities and similar results of those activities as the current user 100.

Figure 7:
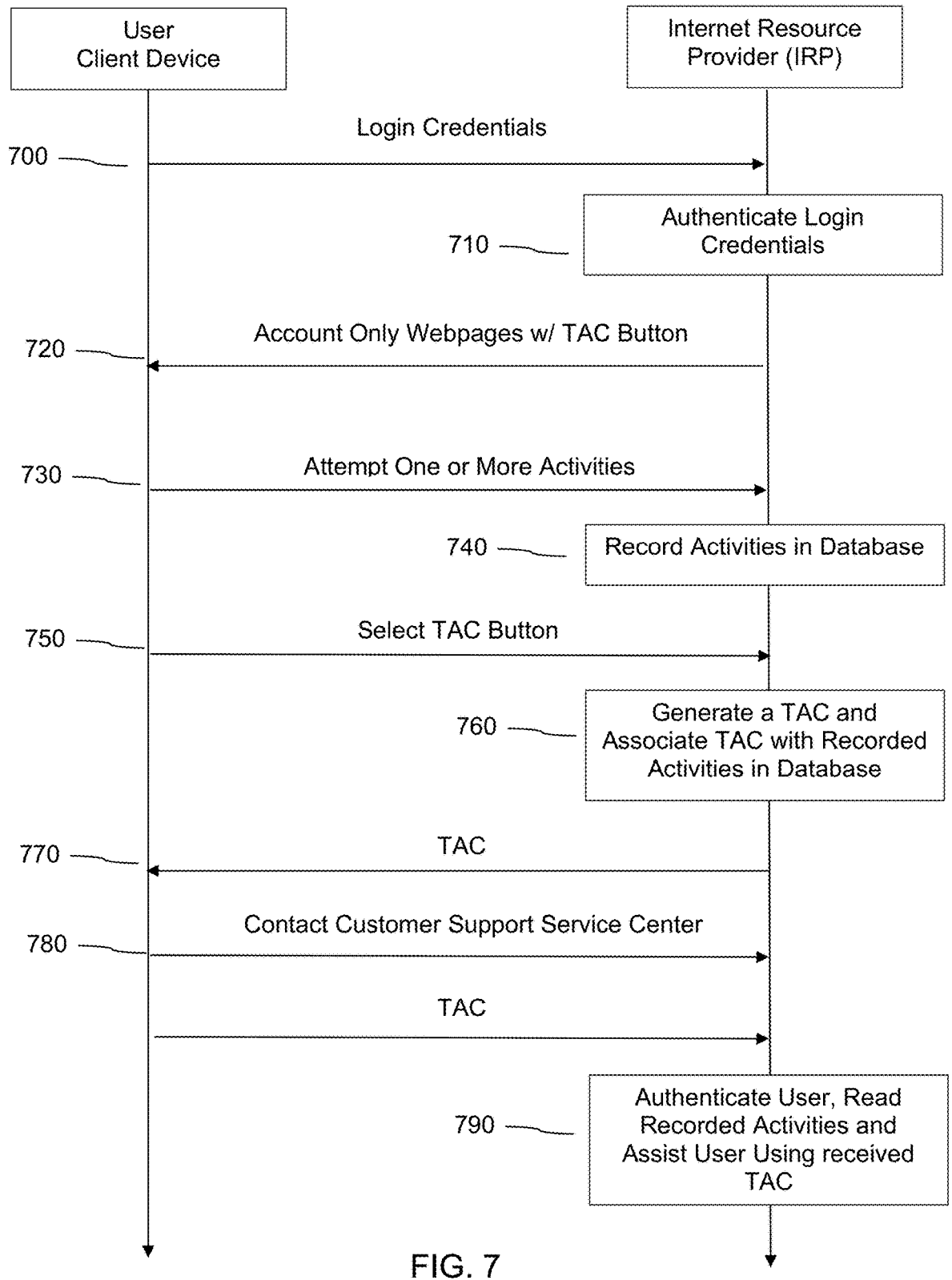
FIG. 7 is a chart showing the order of activities, from top to bottom, performed by a user using a client device and an Internet service provider having a customer support service center.
Figure 8:
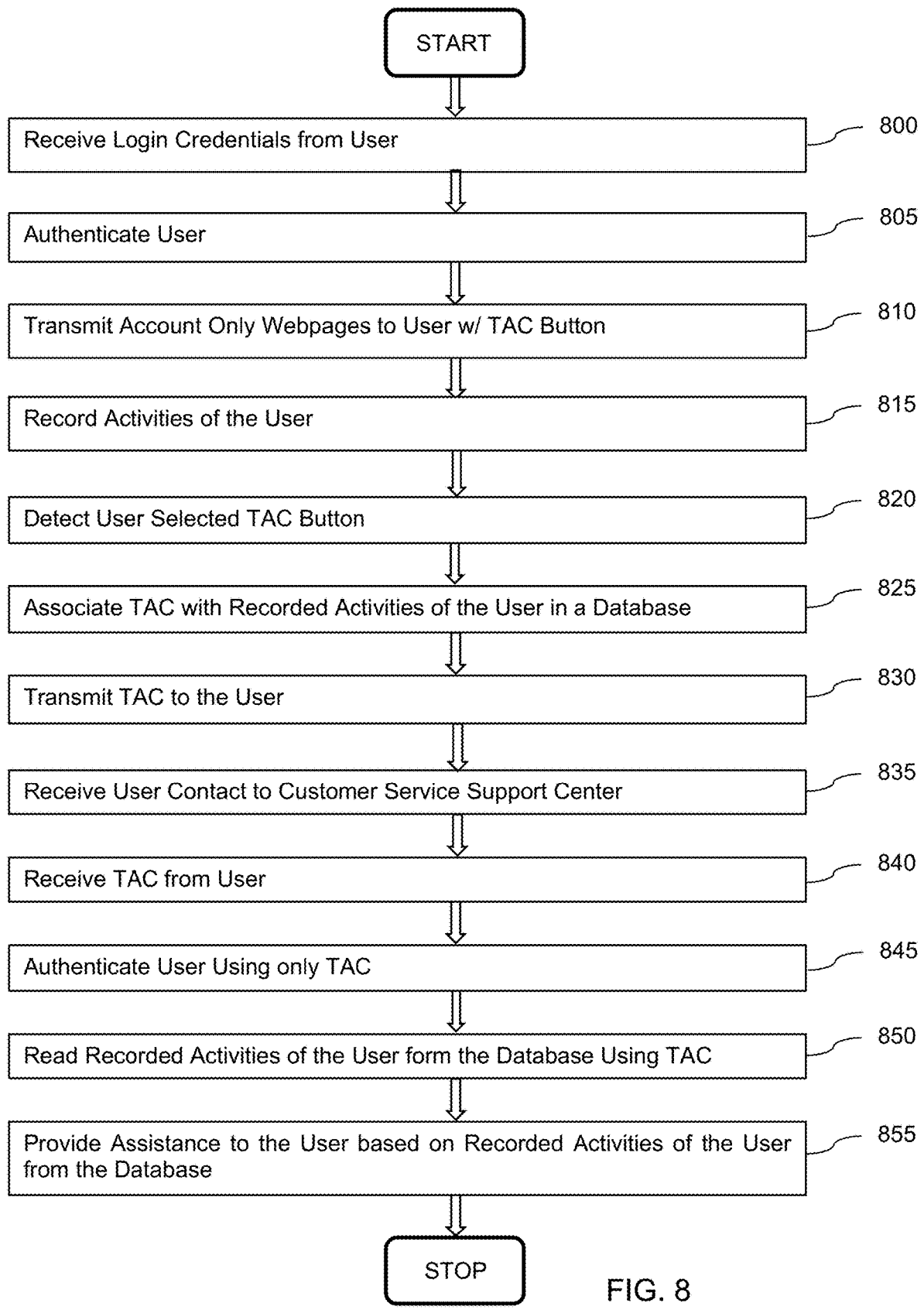
FIG. 8 is a flowchart of an example method of practicing the invention.

Referring to FIGS. 7 and 8, other methods for practicing the present invention are illustrated. A user 100, using a client device 105, may contact an IRP 120, 200 and, using login credentials, log into an account of the user 165. (Steps 700, 800) In preferred embodiments, the user 100 is authenticated by the IRP 120, 200 using at least two different methods, such as what the user 100 knows, e.g., password, what the user 100 has, e.g. cell phone or email account and/or what the user 100 is, e.g. fingerprint. The IRP 120, 200 may confirm that the login credentials sent by the user 100 match the login credentials associated with an account of the user 165. (Steps 710, 805) If the login credentials entered by the user 100 do not match the login credentials associated with the account of the user 165, the user 100 is not authenticated and the user 100 is not logged into the account of the user 165.

Once the user 100 is authenticated, the user 100 may be transmitted webpages 400, 500 by the IRP 120, 200 that include functions that are only appropriate for an authenticated user 100. As an example, a webpage that allows a user 100 to delete, amend or publish a website should only be shown to the user that is the owner of the website. As another example, a webpage that allows a user to delete or renew a domain name or point the domain name to a particular Internet resource should only be shown to the user that is the registrant of the domain name. One or more, or preferably all, of the webpages 400, 500 in the account of the user 165 include a TAC button 430. (Step 720, 810) The TAC button 430 may be an item from a drop-down menu, link or icon that may be selected by the user 100. The IRP 120, 200 may monitor and record the successes and/or failures of various activities attempted by the user 100 while the user 100 is in the account of the user 165. (Step 730) As an example, the IRP 120, 200 may monitor and store all activities that were attempted, but not completed, in a TAC database 155. (Steps 740, 815)

While the user 100 is performing various activities in the account of the user 165, the user 100 may have a question or a problem. The user 100 may select the TAC button 430 from a webpage 400, 500 in the account of the user 165 in anticipation of calling a customer service support center 140 for assistance. (Steps 750, 820) The IRP 120, 200 may, upon detecting the user 100 has selected a TAC button 430 on one of the webpages 400, 500 in the account of the user 165, generate the TAC 510, i.e., a unique random string of characters. The TAC 510 may be used by the user 100 (or a third party given the TAC 510 by the user 100) to be authenticated for a preselected period of time. For example, the TAC 510 may be valid to authenticate the user 100 for 20 minutes, one hour or one day with the customer support service center 140. The IRP 120, 200 may store the TAC 510 in the TAC database 155 in such as a way as to link or associate the TAC 510 with the stored activities of the user in the TAC database 155. (Steps 760, 825) The IRP 120, 200 may also store either the time the TAC 510 as created or a time when the TAC 510 is dead (no longer active) and should be deleted from the TAC database 155. In this manner, the IRP 120, 200 may make sure that only TACs 510 that are within their active time period or life are allowed to be used.

The IRP 120, 200 may transmit the TAC 510 to the user 100 using any desired means of communication. (Steps 770, 830) Preferably the user 100 is able to select the communication means for receiving the TAC 510, such as receiving a text message with the TAC 510 to a cell phone, receiving an email with the TAC 510 to an email account, and/or receiving a webpage 500 with the TAC 510, such as the webpage 500 where the user 100 selected the TAC button 430, on the client device 105.

The IRP 120, 200 may have a customer support service center 140 that customers may contact when the customers have questions or problems with their services. The customer support service center 140 may receive a telephone call (or webpage contact) from the user 100. (Steps 780, 835) The customer support service center 140 may receive the TAC 510 from the user 100. (Step 840) The customer support service center 140 may try to match the TAC 510 to the TACs 510 in the TAC database 155. If the TAC 510 entered by the user 100 does not match any TACs 510 stored in the TAC database 155, the user 100 is not authenticated.

If the TAC 510 entered by the user 100 matches a TAC 510 in the database that is still active (within its lifespan), the customer support service center 140 authenticates the user 100 based solely on the TAC 510 (step 845) and determines one or more activities in the TAC database 155 that are associated with the TAC 510. (Step 850) The one or more activities of the user 100 may be displayed to a customer support representative to enable the customer support representative to more quickly and efficiently understand the question(s) and/or problem(s) of the user 100. Based on the one or more activities, the customer support representative may ask additional questions, provide instructions or take approved actions on behalf of the user 100. (Steps 790, 855) In this manner, the user 100 may have an improved experience in obtaining assistance from the customer support service center 140.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method for a domain name registrar to create a temporary access code (TAC) database comprising a TAC and an activity of a user, comprising the steps of:
   receiving by the registrar login credentials from a client device;
   matching by the registrar the login credentials from the client device with login credentials previously stored in a login database for the user;
   logging the user into the account of the user, wherein the account of the user is configured to allow the client device to receive a plurality of webpages and wherein each webpage in the plurality of webpages:
   comprises a displayed TAC button configured to be selected by the user and
   allows the user to manage a domain name registered to the user;
   while the user is logged into the account of the user:
      storing by the registrar the activity of the user,
      detecting by the registrar that the user selected the TAC button,
      generating by the registrar the TAC, wherein the TAC is only valid for a preselected amount of time,
      storing and associating by the registrar the TAC and the activity of the user in the TAC database, and
      transmitting by the registrar the TAC to the user;
   receiving by a customer support service center of the registrar a communication from the user, wherein the communication comprises the TAC;
   authenticating the user by the customer support service center based only on the TAC matching the TAC in the TAC database and without receiving further identification from the user;
   reading by the customer support service center the activity of the user from the TAC database using the TAC; and
   performing an action by the customer support service center on the domain name normally reserved only for a domain name registrant based at least partially on the activity of the user read from the TAC database.

2. The method of claim 1, wherein the activity of the user comprises an unsuccessful activity of the user or an error code generated by the user.

3. The method of claim 1, wherein the activity of the user comprises a time spent on an activity performed by the user.

4. The method of claim 1, wherein the activity of the user comprises an identification of a webpage displayed to the user when the TAC button was selected.

5. The method of claim 1, wherein the activity of the user comprises a list of webpages displayed to the user.

6. The method of claim 1, wherein the activity of the user comprises a menu item selected by the user.

7. The method of claim 1, wherein the activity of the user comprises data entered into a webpage.

8. The method of claim 1, wherein the TAC is transmitted to the user by the registrar by displaying the TAC on the client device.

9. The method of claim 1, wherein the TAC is transmitted to the user by the registrar by transmitting the TAC to a cell phone of the user.

10. The method of claim 1, wherein the TAC is transmitted to the user by the registrar by emailing the TAC to an email account of the user.

11. A domain name registrar for registering domain names to customers, comprising:
   a processor; and
   a non-transitory memory storing computer executable instructions that when executed by processor, cause the processor to:
      receive login credentials from a client device;
      match the login credentials from the client device with login credentials previously stored in a login database for the user;
      log the user into the account of the user, wherein the account of the user is configured to allow the client device to receive a plurality of webpages and wherein each webpage in the plurality of webpages:
      comprises a displayed temporary access code (TAC) button configured to be selected by the user and allows the user to manage a domain name registered to the user;
      while the user is logged into the account of the user:
         store an activity of the user,
         detect that the user selected the TAC button,
         generate the TAC, wherein the TAC is only valid for a preselected amount of time,
         store and associate the TAC and the activity of the user in a TAC database, and
         transmit the TAC to the user;
      receive a communication from the user, wherein the communication comprises the TAC;
      authenticate the user based only on the TAC matching the TAC in the TAC database and without receiving further identification from the user;
      read the activity of the user from the TAC database using the TAC; and
      perform an action on the domain name normally reserved only for a domain name registrant based at least partially on the activity of the user read from the TAC database.

12. The domain name registrar of claim 11, wherein the activity of the user comprises an unsuccessful activity of the user or an error code generated by the user.

13. The domain name registrar of claim 11, wherein the activity of the user comprises a time spent on an activity performed by the user.

14. The domain name registrar of claim 11, wherein the activity of the user comprises an identification of a webpage displayed to the user when the TAC button was selected.

15. The domain name registrar of claim 11, wherein the activity of the user comprises a list of webpages displayed to the user.

16. The domain name registrar of claim 11, wherein the activity of the user comprises a menu item selected by the user.

17. The domain name registrar of claim 11, wherein the activity of the user comprises data entered into a webpage.

18. The domain name registrar of claim 11, wherein the TAC is transmitted to the user by the registrar by displaying the TAC on the client device.

19. The domain name registrar of claim 11, wherein the TAC is transmitted to the user by the registrar by transmitting the TAC to a cell phone of the user.

20. The domain name registrar of claim 11, wherein the TAC is transmitted to the user by the registrar by emailing the TAC to an email account of the user.

\* \* \* \* \*